United States Patent
Karaki et al.

(10) Patent No.: US 11,228,917 B2
(45) Date of Patent: Jan. 18, 2022

(54) COORDINATION OF UPLINK RADIO TRANSMISSIONS ON UNLICENSED CARRIERS

(71) Applicant: Telefonaktiebolaget LM Ericsson (publ), Stockholm (SE)

(72) Inventors: Reem Karaki, Aachen (DE); Amitav Mukherjee, Elk Grove, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/604,631

(22) PCT Filed: Feb. 14, 2018

(86) PCT No.: PCT/EP2018/053715
§ 371 (c)(1),
(2) Date: Oct. 11, 2019

(87) PCT Pub. No.: WO2018/192699
PCT Pub. Date: Oct. 25, 2018

(65) Prior Publication Data
US 2020/0351667 A1    Nov. 5, 2020

Related U.S. Application Data

(60) Provisional application No. 62/486,492, filed on Apr. 18, 2017.

(51) Int. Cl.
*H04W 16/14* (2009.01)
*H04W 72/04* (2009.01)
(Continued)

(52) U.S. Cl.
CPC ....... *H04W 16/14* (2013.01); *H04W 72/0413* (2013.01); *H04W 72/0453* (2013.01); *H04W 72/14* (2013.01); *H04W 74/0808* (2013.01)

(58) Field of Classification Search
CPC ............ H04W 16/14; H04W 72/0413; H04W 72/0453; H04W 72/14; H04W 74/02;
(Continued)

(56) References Cited

U.S. PATENT DOCUMENTS 9,860,776 B2    1/2018   Yerramalli et al.
2013/0208587 A1  8/2013  Bala et al.
(Continued)

FOREIGN PATENT DOCUMENTS

JP    2015508958 A    3/2015
JP    2017518708 A    7/2017
(Continued)

OTHER PUBLICATIONS

WILUS Inc., "Discussion on UL Multi-Carrier Transmission for eLAA", 3GPP TSG RAN WG1 Meeting #86bis, Lisbon, Portugal, Oct. 10, 2016, pp. 1-4, R1-1610201, 3GPP.
(Continued)

*Primary Examiner* — Minh Trang T Nguyen
(74) *Attorney, Agent, or Firm* — Coats + Bennett, PLLC

(57) ABSTRACT

A radio device (10) controls a first uplink radio transmission on a first carrier (33) from an unlicensed frequency spectrum on the basis of a first access scheme. Further, the radio device (10) controls a second uplink radio transmission on a second carrier (34) from the unlicensed frequency spectrum. The latter is accomplished on the basis of a second access scheme which is different from the first access scheme. Further, the radio device (10) coordinates the first uplink radio transmission and the second uplink radio transmission.

17 Claims, 9 Drawing Sheets

(51) Int. Cl.
*H04W 72/14* (2009.01)
*H04W 74/08* (2009.01)

(58) Field of Classification Search
CPC .. H04W 74/04; H04W 74/0808; H04W 76/15
See application file for complete search history.

(56) References Cited

U.S. PATENT DOCUMENTS

| | | | |
|---|---|---|---|
| 2018/0098349 A1* | 4/2018 | Sun | H04W 72/0406 |
| 2018/0255578 A1 | 9/2018 | Kim et al. | |
| 2019/0174501 A1* | 6/2019 | Yang | H04L 27/0006 |

FOREIGN PATENT DOCUMENTS

| | | | |
|---|---|---|---|
| WO | 2016162760 A1 | 10/2016 | |
| WO | 2017047973 A1 | 3/2017 | |

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 12)", Technical Specification, 3GPP TS 36.211 V12.3.0, Sep. 1, 2014, pp. 1-124, 3GPP.

3rd Generation Partnership Project, "3rd Generation Partnership Project; Technical Specification Group Radio Access Network; Evolved Universal Terrestrial Radio Access (E-UTRA); Physical Layer Procedures (Release 12)", Technical Specification, 3GPP TS 36.213 V12.3.0, Sep. 1, 2014, pp. 1-212, 3GPP.

3rd Generation Partnership Project, "3rd Generation Partnership Project; Technical Specification Group Radio Access Network; Evolved Universal Terrestrial Radio Access (E-UTRA); Medium Access Control (MAC) Protocol Specification (Release 12)", Technical Specification, 3GPP TS 36.321 V12.1.0, Mar. 1, 2014, pp. 1-57, 3GPP.

3rd Generation Partnership Project, "3rd Generation Partnership Project; Technical Specification Group Radio Access Network; Study on Licensed-Assisted Access to Unlicensed Spectrum (Release 13)", Technical Report, 3GPP TR 36.889 V13.0.0, Jun. 1, 2015, pp. 1-285, 3GPP.

Multefire Alliance, "MulteFire Release 1.0 Technical Paper", Jan. 20, 2017, pp. 1-25, retrieved on Sep. 5, 2019, retrieved from internet: https://www.multefire.org/wp-content/uploads/MulteFire-Release-1.0-whitepaper_FINAL.pdf.

ETSI, "5 GHz RLAN; Harmonised Standard Covering the Essential Requirements of Article 3.2 of Directive 2014/53/EU", Harmonised European Standard, ETSI EN 301 893 V2.1.0, Mar. 1, 2017, pp. 1-120, ETSI.

3rd Generation Partnership Project, "3rd Generation Partnership Project; Technical Specification Group Radio Access Network; Evolved Universal Terrestrial Radio Access (E-UTRA); Multiplexing and Channel Coding (Release 12)", Technical Specification, 3GPP TS 36.212 V12.6.0, Sep. 1, 2015, pp. 1-95, 3GPP.

* cited by examiner

COORDINATION OF UPLINK RADIO TRANSMISSIONS ON UNLICENSED CARRIERS

TECHNICAL FIELD

The present invention relates to methods for controlling radio transmissions in a wireless communication network and to corresponding devices and systems.

TECHNICAL FIELD

Wireless communication networks, such as wireless communication networks based on the LTE (Long Term Evolution) technology specified by 3GPP ($3^{rd}$ Generation Partnership project), typically operate in a licensed frequency spectrum, i.e., on frequency resources which are dedicated to a certain radio technology and operator. Further, also the utilization of radio resources from an unlicensed frequency spectrum, e.g., in the 5 GHz or 3.5 GHz frequency band, may be possible. Typically, radio resources from such unlicensed frequency spectrum are shared with another operator or one or more other radio technologies. The unlicensed spectrum is used as a complement to the licensed spectrum or allows completely standalone operation.

In the LTE technology radio resources from an unlicensed frequency spectrum may be utilized on the basis of a technology referred to as "Licensed-Assisted Access" (LAA). Aspects of the LAA technology are discussed in 3GPP TR 36.889 V13.0.0 (2015-06). In the LAA technology the unlicensed spectrum is used as a complement to the licensed spectrum. Using carriers from the licensed spectrum, a UE (user equipment) connects to the network. The carriers from the licensed spectrum are also referred to as primary cell or PCell. In addition one or more additional carriers, referred to as secondary cell or SCell, from the unlicensed spectrum are used to enhance transmission capacity. For this purpose, a carrier aggregation functionality of the LTE technology is utilized. The carrier aggregation functionality allows to aggregate two or more carriers, i.e., frequency channels. In a typical LAA scenario, at least one of the aggregated carriers is from the licensed spectrum and at least one of the aggregated carrier is from the unlicensed spectrum.

Due to regulatory requirements, transmissions in the unlicensed spectrum are typically permitted only with prior channel sensing, transmission power limitations, and/or imposed maximum channel occupancy time. To take into account that the radio resources from the unlicensed spectrum are shared with other operators or other radio technologies, an LBT (listen-before-talk) procedure may be need to performed before proceeding to a transmission in the unlicensed spectrum. Typically, the LBT procedure involves sensing the carrier for a pre-defined minimum amount of time and backing off if the carrier is busy. If on the other hand the transmissions on the radio resources are coordinated in a centralized manner, like by dynamic scheduling as used in the LTE technology, performance may be significantly degraded because situations may occur where the centralized scheduling may grant a transmission, but the transmission is not possible because the carrier is busy, or situations may occur where the carrier would be free, but a transmission was not granted by the centralized scheduling. In the case of the LAA technology, this may for example affect the performance of uplink (UL) transmissions from the UE to the network. However, good performance for the UL transmissions is becoming more relevant, e.g., due to increasing usage of user-centric applications and an increasing need to push data to cloud storage. Moreover, when utilizing multiple carriers from an unlicensed frequency spectrum, these carriers could require utilization of different access schemes. For example, one carrier could use an access scheme based on dynamic scheduling using scheduling requests from the UE, while another carrier could use a grant-less access scheme, which does not require that radio resources are allocated in response to a scheduling request. In such cases, an ongoing UL radio transmission on one of the carriers may adversely affect the chances of the UE to successfully gain access to the other carrier.

Accordingly, there is a need for techniques which allow for efficient control of UL radio transmissions in an unlicensed spectrum.

SUMMARY

According to an embodiment of the invention, a method of controlling radio transmission in a wireless communication network is provided. According to the method, a radio device controls a first UL radio transmission on a first carrier from an unlicensed frequency spectrum on the basis of a first access scheme. Further, the radio device controls a second UL radio transmission on a second carrier from the unlicensed frequency spectrum. This is accomplished on the basis of a second access scheme which is different from the first access scheme. Further, the radio device coordinates the first UL radio transmission and the second UL radio transmission.

According to a further embodiment of the invention, a radio device is provided. The radio device is configured to control a first UL radio transmission on a first carrier from an unlicensed frequency spectrum on the basis of a first access scheme. Further, the radio device is configured to control a second UL radio transmission on a second carrier from the unlicensed frequency spectrum. The radio device is configured to control the second UL radio transmission on the basis of a second access scheme which is different from the first access scheme. Further, the radio device is configured to coordinate the first UL radio transmission and the second UL radio transmission.

According to a further embodiment of the invention, a system is provided. The system comprises a radio device. Further, the system comprises an access node of a wireless communication network. The radio device is configured to control a first UL radio transmission on a first carrier from an unlicensed frequency spectrum on the basis of a first access scheme. Further, the radio device is configured to control a second UL radio transmission on a second carrier from the unlicensed frequency spectrum. The radio device is configured to control the second UL radio transmission on the basis of a second access scheme which is different from the first access scheme. Further, the radio device is configured to coordinate the first UL radio transmission and the second UL radio transmission. The access node is configured to receive the first UL radio transmission and the second UL radio transmission.

According to a further embodiment of the invention, a computer program or computer program product is provided, e.g., in the form of a non-transitory storage medium, which comprises program code to be executed by at least one processor of a radio device. Execution of the program code causes the radio device to control a first UL radio transmission on a first carrier from an unlicensed frequency spectrum on the basis of a first access scheme. Further, execution of the program code causes the radio device to control a second UL radio transmission on a second carrier from the unlicensed frequency spectrum. Execution of the program code causes the radio device to control the second UL radio transmission on the basis of a second access scheme which is different from the first access scheme. Further, execution of the program code causes the radio device to coordinate the first UL radio transmission and the second UL radio transmission.

Details of such embodiments and further embodiments will be apparent from the following detailed description of embodiments.

DETAILED DESCRIPTION OF EMBODIMENTS

Figure 1:
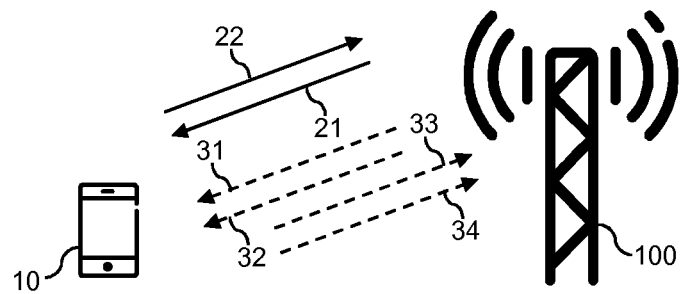
FIG. 1 schematically illustrates a wireless communication system in which radio transmissions are controlled according to an embodiment of the invention.

In the following, concepts in accordance with exemplary embodiments of the invention will be explained in more detail and with reference to the accompanying drawings. The illustrated embodiments relate to control of radio transmissions in a wireless communication network, specifically to control of UL radio transmissions from a radio device, in the following also referred to as UE. The wireless communication network is assumed to be based on a radio technology which may operate in an unlicensed frequency spectrum, such as the unlicensed 3.5 GHz or 5 GHz band. Specifically, the radio technology may be based on using the LTE radio technology in an unlicensed frequency spectrum, e.g., using the licensed-assisted access (LAA) technology as discussed in 3GPP TR 36.889 V13.0.0 (2015-06). However, it is noted that the illustrated concepts may also be applied to other technologies, e.g., a 5G ($5^{th}$ Generation) wireless communication technology. Further, the concepts could also be applied to standalone operation of the LTE radio technology or similar radio technology in the unlicensed frequency spectrum, without coordination or other assistance by transmissions in a licensed frequency spectrum, e.g., using MuLTEfire operation as specified in MuLTEfire Release 1.0 Technical Paper (2017-01).

In the illustrated concepts, UL radio transmissions from a UE are performed on multiple carriers from an unlicensed frequency spectrum, in the following also referred to as unlicensed carriers. Further, it is assumed that for at least some of the carriers different access schemes are used. For example, one more of the carriers may use dynamic scheduling and require that the UE receives a grant assigning radio resources to be used for the UL radio transmission(s) while one or more others of the carriers may use an access scheme based on semi-persistent allocation of radio resources or based on using IUA (Instant UL Access) allocation, or grant-less access.

As used herein, the semi-persistent allocation of radio resources refers to an allocation of radio resources which is valid in a reoccurring manner in multiple subframes, without requiring a request from the UE. However, the semi-persistent allocation of radio resources may nonetheless be controlled by the wireless communication network. Specifically, the wireless communication network may configure the semi-persistent allocation of radio resources, e.g., in terms of radio resources, and also control activation and deactivation of the semi-persistent allocation of radio resources. Accordingly, by using the semi-persistent allocation of radio resources, the radio resources can be allocated to the UE in an extended time interval starting from activation of the semi-persistent allocation of radio resources by the wireless communication network until deactivation or release of the semi-persistent allocation of radio resources. The deactivation or release of the semi-persistent allocation of radio resources may be actively initiated by the wireless communication network or triggered in an implicit manner, e.g., by lack of usage of the semi-persistently allocated radio resources. The IUA allocation is similar to the semi-persistent allocation as described above. In the case of an IUA allocation, the UE is however not obliged to transmit on the allocated radio resources. Grant-less access may refer to an access scheme which does not involve network-controlled allocation of radio resources to the UE.

FIG. 1 schematically illustrates an exemplary scenario in which a UE 10, e.g., a mobile phone, a tablet computer, or other kind of communication device, communicates with an access node 100 of the wireless communication network. In accordance with the assumed utilization of the LTE radio technology, the access node 100 may also be referred to as eNB ("evolved Node B"). In the scenario of FIG. 1, the communication between the UE 10 and the access node 100 is LAA based, i.e., uses carriers from both a licensed frequency spectrum and the unlicensed frequency spectrum. Specifically, a DL (downlink) carrier 21 from the licensed frequency spectrum is used for DL radio transmissions from the access node 100 to the UE 10, and a UL carrier 22 from the licensed frequency spectrum is used for UL radio transmissions from the UE 10 to the access node 100. The carriers 21, 22 may also be referred to as PCell of the UE 10. In addition, DL carriers 31, 32 from the unlicensed frequency spectrum may be used for DL radio transmissions from the access node 100 to the UE 10, and/or UL carriers 33, 34 from the unlicensed frequency spectrum may be used for UL radio transmissions from the UE 10 to the access node 100. It is noted that in some scenarios the same carrier, e.g., the carrier 31, the carrier 32, the carrier 33, and/or the carrier 34, could also be used for both DL radio transmissions from the access node 100 to the UE 10 and UL radio transmissions from the UE 10 to the access node 100, e.g., by using the carrier in a TDD (Time Division Duplex) mode. The carriers 31, 32, 33, 34 may also be referred to as SCell(s) of the UE 10.

Figure 2:
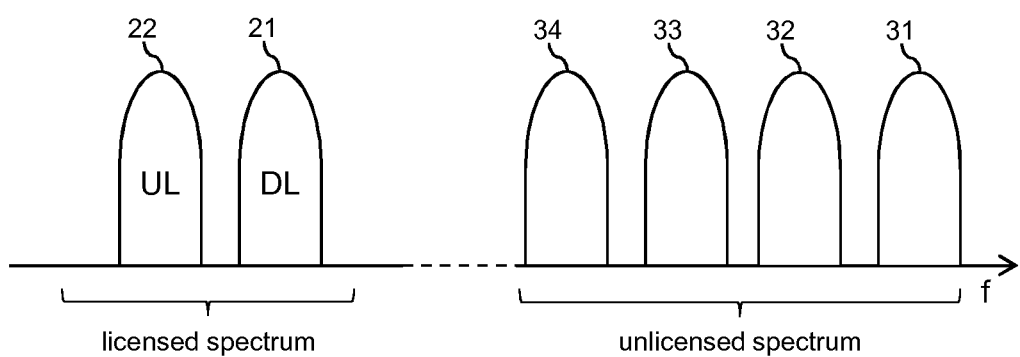
FIG. 2 illustrates utilization of radio resources from an unlicensed spectrum according to an embodiment of the invention.

FIG. 2 schematically illustrates the carriers 21, 22, 31, 32, 33, 34 in frequency (f) space. As illustrated, the carriers 21, 22 are in a licensed frequency spectrum, e.g., in one of the LTE bands between 700 MHz and 2.7 GHz. The carriers 21, 22, which are dedicated to the LTE radio technology and licensed to the operator of the wireless communication network, i.e., may not be used by other radio technologies or operators, may be used for reliable transmission of control information between the UE 10 and the access node 100. For example, one or more DL control channels, like a PDCCH (Physical DL Control Channel) or ePDDCH (enhanced PDDCH) may be transmitted on the DL carrier 21. Similarly, one or more UL control channels, like a PUCCH (Physical UL Control Channel) may be transmitted on the UL carrier 22. Further, the carriers may be used for transmission of a data channel. For example, one or more DL data channels, like a PDSCH (Physical DL Shared Channel) may be transmitted on the DL carrier 21. Similarly, one or more UL data channels, like a PUSCH (Physical UL Shared Channel) may be transmitted on the UL carrier 22. The PDSCH and the PUSCH are used in a shared manner by multiple UEs, and allocation of radio resources of the PDSCH or PUSCH to a certain UE, like the UE 10, is accomplished by the access node 100. The carriers 31, 32, 33, 34 which are shared with other operators or radio technologies, may be used for enhancing transmission capacity or transmission performance between the UE 10 and the access node 100. Control information for the carriers 31, 32, 33, 34 may be transmitted on the carriers 21, 22, i.e., transmissions on the carriers 31, 32, 33, 34 may be assisted by transmissions on the carriers 21, 22. The carriers 31, 32, 33, 34 may thus also be referred to as LAA SCell(s). To enhance the transmission capacity or performance, one or more DL data channels, like a PDSCH, may be transmitted on the DL carriers 31, 32 and/or one or more UL data channels, like a PUSCH, may be transmitted on the UL carriers 33, 34. Like in the licensed frequency spectrum, the PDSCH and the PUSCH in the unlicensed frequency spectrum are used in a shared manner by multiple UEs, and allocation of radio resources of the PDSCH or PUSCH to a certain UE, like the UE 10, is accomplished by the access node 100.

The operation as illustrated in FIGS. 1 and 2, which uses separate carriers for the DL and UL transmission direction, corresponds to an FDD (Frequency Division Duplex) mode. However, it is noted that in some scenarios DL radio transmissions and UL radio transmissions could also be performed on the same carrier, e.g., one of the carriers 21, 22, 31, 32, 33, 34, using different time slots for the DL radio transmissions and UL radio transmissions, e.g., using a TDD mode.

In the case of standalone operation using exclusively carriers from the unlicensed frequency spectrum, e.g., MuL-TEfire operation, usage of the carriers 21, 22 could be omitted, and also control channels, like a PDCCH, ePDCCH, MF-sPUCCH or MF-ePUCCH, could be transmitted on the carriers 31, 32, 33, 34 from the unlicensed frequency spectrum.

Figure 3A:
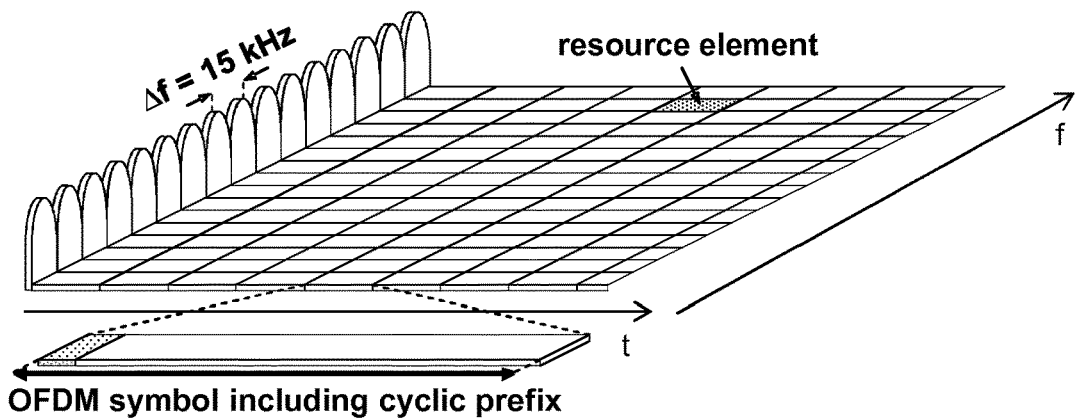
FIG. 3A-3D illustrate allocation of radio resources according to an embodiment of the invention.

FIG. 3A-3D illustrate the allocation of radio resources in the LTE radio technology. For the DL radio transmissions, the LTE radio technology uses OFDM (Orthogonal Frequency Division Multiplexing). As illustrated in FIG. 3A, the underlying time-frequency grid is in the frequency (f) domain defined by multiple subcarriers of 15 kHz width, and in the time (t) domain defined by a sequence of OFDM symbols forming a subframe of 1 ms duration. Each OFDM symbol starts with a cyclic prefix. A similar time-frequency grid, using the same subcarrier spacing and number of modulation symbols is used for the UL radio transmissions. For the UL radio transmissions, the LTE radio technology uses DFT (Discrete Fourier Transform) spread OFDM, also referred to as single-carrier FDMA (Frequency Division Multiple Access). Accordingly, the radio resources of the LTE radio technology can be regarded as being organized in a time-frequency grid defining resource elements each corresponding to one subcarrier during and one modulation symbol interval, e.g., as illustrated in FIG. 1.

Figure 3B:
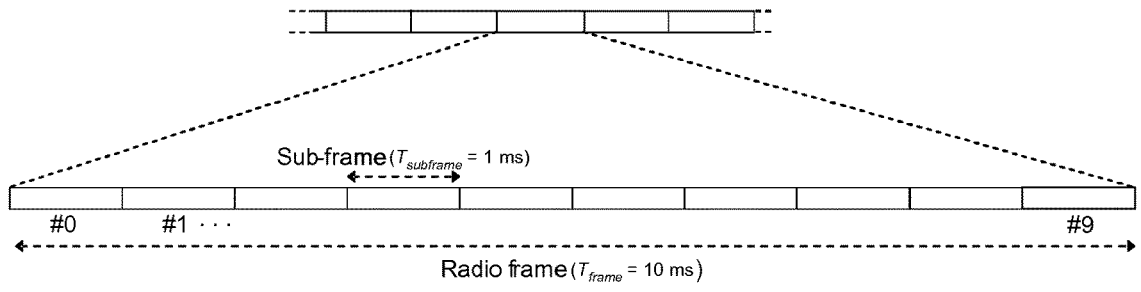

FIG. 3B further illustrates organization of the LTE radio transmissions in the time domain. As illustrated, the radio transmissions are organized in a sequence of radio frames, and each radio frame is formed of multiple subframes. The DL radio transmissions are organized in radio frames of 10 ms, and each of these radio frame consists of ten equally-sized subframes having a length Tsubframe=1 ms, as indicated in FIG. 3B. Each subframe comprises two slots which each have a duration of 0.5 ms. Within a radio frame, the slots are sequentially numbered within a range from 0 to 19. For normal cyclic prefix length, one subframe consists of 14 OFDM symbols, and the duration of each symbol is approximately 71.4 µs.

The resource allocation in LTE radio technology is typically defined in terms of resource blocks, where a resource block corresponds to one slot (0.5 ms) in the time domain and 12 contiguous subcarriers in the frequency domain. A pair of two adjacent resource blocks in time direction (1.0 ms) is also referred to as a resource block pair. The resource blocks are indexed in the frequency domain, starting with index 0 from one end of the system bandwidth.

Figure 3C:
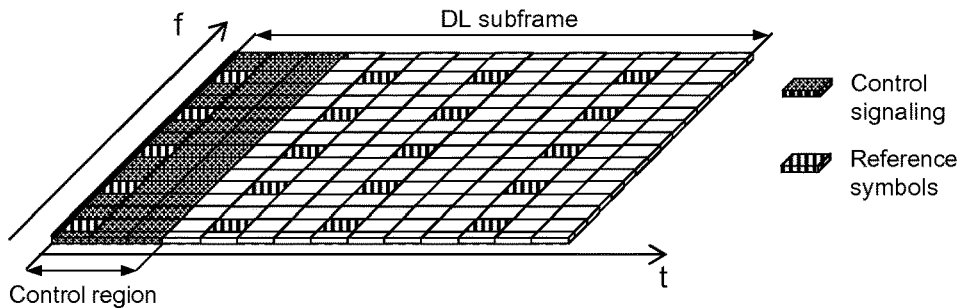

The DL radio transmissions are typically subject to dynamic scheduling. That is to say, in each subframe the access node 100 transmits DL control information (DCI). The control information indicates to which UEs data is transmitted in this subframe, and in which resource blocks include the data for a specific UE. FIG. 3C shows an example of DL subframe. As illustrated, the DCI may be transmitted in the first OFDM symbols of the DL subframe, also referred to as control region of the DL subframe. Typically, the control region corresponds to the first 1, 2, 3 or 4 OFDM symbols of the DL subframe. The number n of the OFDM symbols defining the control region is also referred to as CFI (Control Format Indicator). As illustrated, the DL subframe also contains reference symbols, which are known to the receiver and used for demodulation purposes, e.g., for coherent demodulation of the control information. In the example of FIG. 3C, CFI=3 is assumed. The reference symbols may also include cell specific reference symbols (CRS) which may be are used to support various functions, such as fine time and frequency synchronization and channel estimation for certain transmission modes.

Figure 3D:
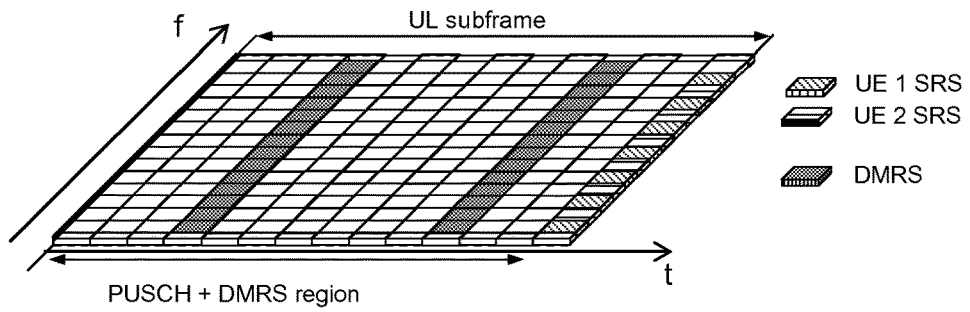

Also the UL radio transmissions are typically subject to dynamic scheduling. For this purpose, the access node 100 may indicate in the DCI information which UEs shall transmit UL data in a subsequent subframe, and in which resource blocks the UL data is to be transmitted by the UE(s). FIG. 3D shows an example of a UL subframe. The UL resource grid may include UL data and UL control information. The UL data and the UL control information may be included in a shared data channel, referred to as PUSCH (Physical UL Shared Channel). Further, the UL control information may be included in a control channel, referred to as PUCCH (Physical UL Control Channel). As further illustrated, a UL subframe may also include various reference signals, such as demodulation reference signals (DMRS) and sounding reference signals (SRS). DMRS are used for coherent demodulation of the PUSCH and PUCCH. The SRS are typically not associated with any data or control information and are used to estimate the UL channel quality, e.g., for purposes of frequency-selective scheduling. As illustrated in FIG. 3D, the DMRS and SRS are time-multiplexed into the UL subframe, and the SRS are transmitted in the last symbol of the UL subframe. The DMRS are typically transmitted once every slot for subframes with normal cyclic prefix, and may be located in the fourth and eleventh SC-FDMA symbols.

In the LTE radio technology, the DCI may for example indicate the following information for controlling UL radio transmissions:

radio resources allocated for a UL radio transmission (including whether frequency hopping is applied).

a modulation and coding scheme (MCS) to be applied for a UL radio transmission redundancy versions (RV) to be applied for a UL radio transmission a new data indicator (NDI) for controlling whether the UE shall transmit new data or perform a retransmission a transmit power control (TPC) command information on DMRS to be used in a UL radio transmission in the case of cross-carrier scheduling, a target carrier index indicating a carrier to which the DCI applies.

The DCI is typically UE specific and CRC (Cyclic Redundancy Check) protected, typically using CRC bits. The UE specific character of the DCI is achieved by scrambling the CRC bits with a UE-specific identifier, e.g., a C-RNTI (Cell Radio Network Temporary Identifier). Further, the DCI and scrambled CRC bits typically protected by convolutional coding. Typically, the access node 100 assigns a unique C-RNTI to every UE associated to it. The C-RNTI can take values in the range 0001-FFF3 in hexadecimal format. When the UE 10 is simultaneously served by multiple cells, such as the above-mentioned PCell and SCell, the UE 10 will typically use the same C-RNTI on all serving cells.

The DCI may be transmitted in a DL control channel referred to as PDCCH (Physical DL Control Channel), which exclusively uses resource elements from the control region of the DL subframe. Further, DL control information may also be transmitted in a DL control channel referred to as ePDCCH, which uses resource elements outside the control region. A specific type of DL control information which may be transmitted in the PDCCH or ePDCCH is scheduling information, such as a DL assignment, allocating DL radio resources for a DL radio transmission to the UE 10, or a UL grant, allocating UL radio resources for a UL radio transmission from the UE 10.

The dynamic scheduling of UL radio transmissions may be accomplished in the following manner: The UE 10 reports to the access node 100 when it needs to transmit UL data, e.g., by sending a scheduling request (SR). In response to the SR, the access node 100 allocates the radio resources and sends corresponding scheduling information in an UL grant to the UE 10. If the allocated radio resources are not sufficient to transmit all the UL data, the UE 10 may further send a buffer status report (BSR) on the allocated radio resources, thereby informing the access node 100 about the amount of UL data still pending for transmission. In response to the BSR, the access node 100 may allocate further radio resources to the UE 10, so that the UE 10 can continue with the transmission of the UL data In more detail, if the UE's buffer 10 for UL data to be transmitted is empty and new UL data arrives in the buffer, dynamic scheduling may be performed according to the following procedure:

1. Using the PUCCH, the UE 10 sends a SR to the access node 100. The SR informs the access node 100 that the UE 10 needs to transmit UL data. For sending the SR, the UE 10 may utilize a timeslot which is allocated according to a periodic schedule, e.g., with an interval of 5, 10, or 20 ms.

2. When the access node 100 receives the SR, it responds with a small UL grant that allocates radio resources which are just sufficient to indicate the amount of UL data pending in the buffer by a BSR. This reaction to the SR typically takes 3*ms*.

3. After the UE 10 received and processed the initial UL grant, which may take about 3 ms, it typically sends an UL radio transmission with the BSR. The BSR is a CE (Control Element) of a MAC (Medium Access Control) protocol of the LTE radio technology. If the initial UL grant is big enough, the UE 10 may also include at least a part of the UL data into the UL radio transmission.

4. Upon receiving the BSR, the access node 100 allocates radio resources in accordance with the amount of pending UL data indicated by the BSR and sends a corresponding further UL grant to the UE 10. By transmitting the pending UL data on the allocated radio resources, the UE 10 may then drain its buffer.

In the above example of a dynamic scheduling procedure, a delay of 16 ms or more can occur between arrival of the UL data in the empty buffer and reception of this UL data by the access node 100. This delay can be further increased by the UE 10 having to wait for the next opportunity to the SR and/or by the UE 10 having to perform a random access procedure to obtain synchronization and being allocated with SR opportunities.

Figure 4A:
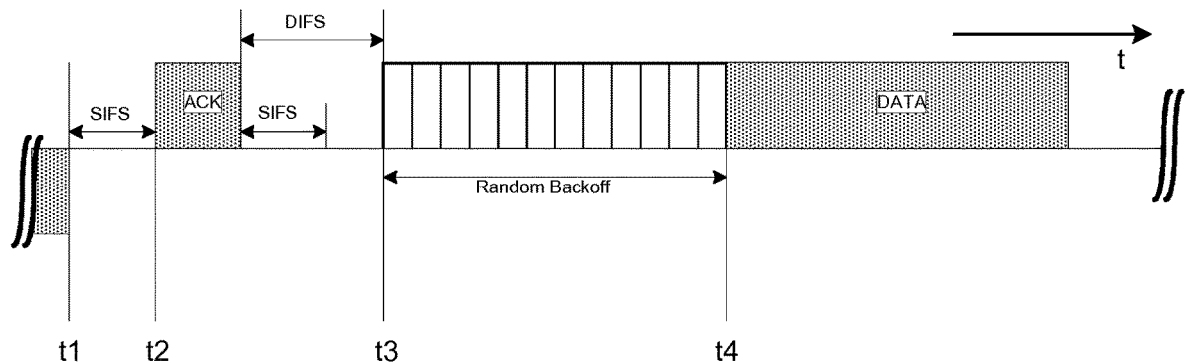
FIG. 4A schematically illustrates a collision avoidance scheme as used according to an embodiment of the invention.

For usage of the carriers 31, 32, 33, 34 from the unlicensed frequency band, the UE 10 and the access node 100 may need to implement an LBT procedure or similar mechanism to avoid conflicts with other radio devices or radio technologies which may potentially use the carriers 31, 32, 33, 34. FIG. 4A illustrates an example of an LBT procedure which may be used to ensure coexistence with WLAN transmissions on the carrier 32.

In the example of FIG. 4A, it is assumed that two WLAN stations, referred to as station A and station B, transmit on the carrier 33 from the unlicensed frequency spectrum. At time t1 station A finishes transmission of a data frame to station B. After a time termed as SIFS (Short Inter Frame Space), station B sends an ACK frame back to station A. The SIFS time may for example be 16 μs. The station B sends the ACK frame without performing a LBT operation. Before another radio device, such as the UE 10, can transmit on the carrier 33, it first needs to sense the carrier 33 to determine whether it is occupied. If it find during the transmission of the ACK frame by station B the carrier 33 is found to be occupied the other radio device needs to defer for a time referred to as DIFS (Distributed Inter Frame Space), which is longer than the SIFS time such as 34 µs. In this way, it can be prevented that the other radio device interferes with the transmission of the ACK frame. Therefore, a radio device, such as the UE 10, that wishes to transmit first performs a CCA (Clear Channel Assessment) by sensing the carrier for the DIFS time. If the medium is idle then the radio device assumes that the carrier 33 is free and that it may transmit on the carrier 33. If the carrier 33 is found to be busy, the radio device waits until the carrier 33 goes idle, and defers for the DIFS time. Further, the radio device may wait for a random backoff period before it can start to transmit on the carrier 33 at t4. The random backoff period has the purpose of reducing the risk of collisions when multiple radio devices are ready to transmit when the carrier 33 goes idle. In the example of FIG. 4A, the radio device starts a random backoff counter at t3 and defers for a corresponding number of time slots. The random backoff counter may be selected as a random integer of not more than a backoff contention window size CW. To avoid recurring collisions, the backoff contention window size CW may be doubled whenever a collision is detected, up to a limit CWmax. When a transmission attempt is successful without collision the contention window is reset back to its initial value.

Figure 4B:
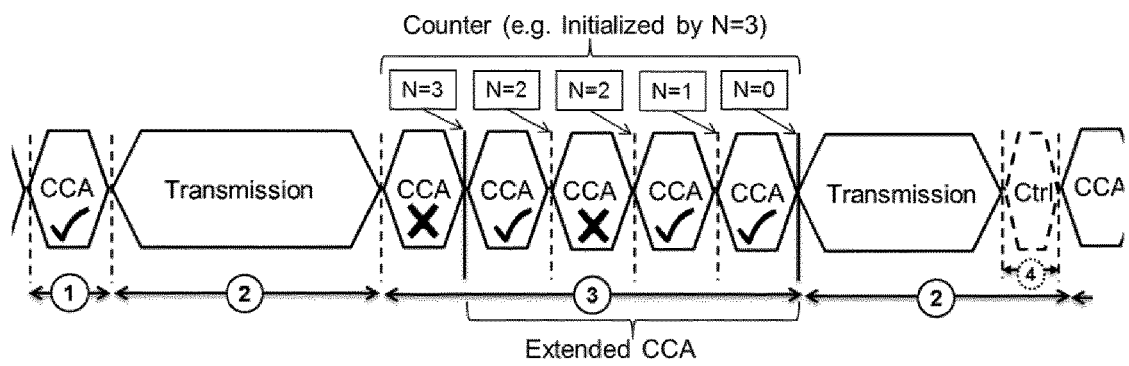
FIG. 4B schematically illustrates a further collision avoidance scheme as used according to an embodiment of the invention.

FIG. 4B illustrates a further example of an LBT procedure which is based on Load-based CCA according to ETSI Draft EN 301 893 V2.1.0 (2017-03). In this case, a radio device not using a WLAN protocol, such as the UE 10, may use load based adaptive channel access. The radio device that initiates a sequence of one or more transmissions is denoted as the Initiating Device. Otherwise, the radio device is denoted as a Responding Device. The Initiating Device implements a channel access mechanism which is based on prioritized, truncated exponential backoff. Before a transmission or a burst of transmissions on an Operating Channel, such as the carrier 33, the Initiating Device operates at least one Channel Access Engine (up to four access engines can be operated simultaneously, corresponding to different data priority classes) that executes a procedure described in step 1) to step 8) below. A single Observation Slot shall have a duration of not less than 9 µs.

1) The Channel Access Engine sets a contention window CW to a minimum value CWmin.

2) The Channel Access Engine selects a random number q from a uniform distribution over the range 0 to CW.

3) The Channel Access Engine initiates a Prioritization Period as described in step 3) a) to step 3) c):

a) The Channel Access Engine sets p according to the priority class associated with this Channel Access Engine b) The Channel Access Engine waits for a period of 16 µs.

c) The Channel Access Engine performs CCA on the Operating Channel during a single Observation Slot:

i) The Operating Channel is considered occupied if other transmissions within this channel are detected with a level above an ED (Energy Detect) threshold. In this case, the Channel Access Engine shall initiate a new Prioritization Period starting with step 3) a) after the energy within the channel has dropped below the ED threshold.

ii) In case no energy within the Operating Channel is detected with a level above the ED threshold, p may be decremented by not more than 1. If p is equal to 0, the Channel Access Engine shall proceed with step 4), otherwise the Channel Access Engine shall proceed with step 3) c).

4) The Channel Access Engine performs a Backoff Procedure as described in step 4) a) to step 4)d):

a) This step verifies if the Channel Access Engine satisfies the Post Backoff condition. If q<0 and the Channel Access Engine is ready for a transmission, the Channel Access Engine shall set CW equal to CWmin and shall select a random number q from a uniform distribution over the range 0 to CW before proceeding with step 4) b).

b) If q<1 the Channel Access Engine proceeds with step 4) d). Otherwise, the Channel Access Engine may decrement the value q by not more than 1 and the Channel Access Engine shall proceed with step 4) c).

c) The Channel Access Engine shall perform CCA on the Operating Channel during a single Observation Slot d) If the Channel Access Engine is ready for a transmission the Channel Access Engine shall continue with step 5). Otherwise, the Channel Access Engine shall decrement the value q by 1 and the Channel Access Engine shall proceed with step 4) c). It should be understood that q can become negative and keep decrementing as long as the Channel Access Engine is not ready for a transmission.

5) If only one Channel Access Engine of the Initiating Device is in this stage the Channel Access Engine proceeds with step 6). If the Initiating Device has a multitude of Channel Access Engines in this stage, the Channel Access Engine with highest Priority Class in this multitude shall proceed with step 6) and all other Channel Access Engines in the current stage shall proceed with step 8).

6) The Channel Access Engine may start transmissions belonging to the corresponding or higher Priority Classes, on one or more Operating Channels.

a) The Channel Access Engine can have multiple transmissions without performing an additional CCA on this Operating Channel providing the gap in between such transmissions does not exceed 16 µs. Otherwise, if this gap exceeds 16 µs and does not exceed 25 µs, the Initiating Device may continue transmissions provided that no energy was detected with a level above the ED threshold for a duration of one Observation Slot.

b) The Channel Access Engine may grant an authorization to transmit on the current Operating Channel to one or more Responding Devices. If the Initiating Device issues such a transmission grant to a Responding Device, the Responding Device shall operate according to the procedure described below after Step 8.

c) The Initiating Device may have simultaneous transmissions of Priority Classes lower than the Priority Class of the Channel Access Engine, provided that the corresponding transmission duration (Channel Occupancy Time) is not extended beyond the time that is needed for the transmission (s) corresponding to the Priority Class of the Channel Access Engine.

7) When the Channel Occupancy has completed, and it has been confirmed that at least one transmission that started at the beginning of the Channel Occupancy was successful, the Initiating Device proceeds with step 1) otherwise the Initiating Device proceeds with step 8).

8) The Initiating Device may retransmit. If the Initiating Device does not retransmit the Channel Access Engine shall discard all data packets associated with the unsuccessful Channel Occupancy and the Channel Access Engine shall proceed with step 1). Otherwise, the Channel Access Engine shall adjust CW to $((CW+1) \times m)-1$ with $m \geq 2$. If the adjusted value of CW is greater than CWmax the Channel Access Engine may set CW equal to CWmax. The Channel Access Engine shall then proceed with step 2).

The Responding Device may transmit either without performing a CCA, if these transmissions are initiated at most 16 µs after the last transmission by the Initiating Device that issued the grant, or it performs CCA on the Operating Channel during a single observation slot within a 25 µs period ending immediately before the granted transmission time.

In the following coordination of UL radio transmissions on different unlicensed carriers will be explained by referring to examples illustrated in FIGS. 5, 6, 7, 8, 9A, 9B, 10A, and 10B. In these examples, a UE, such as the above-mentioned UE 10, is configured with more than one unlicensed carrier for UL transmissions, of which at least one, denoted by CC1, is configured to be used on the basis of an access scheme involving dynamic scheduling, and of which at least one other, denoted by CC2, is configured to be used on the basis of an access scheme involving grant-less transmission. The carriers CC1 and CC2 may for example correspond to the above-mentioned carriers 33 and 34. The utilization of different access schemes on the two carriers CC1, CC2 may for example be due to heterogeneous traffic and interference levels, or due to the clustering of UEs capable of grant-less UL radio transmissions on a carrier that is separate from one or more carriers utilized by legacy UEs which only support dynamically scheduled UL radio transmissions. On each of the carriers CC1, CC2, successful CCA is required before the UE can start transmitting on the carrier CC1, CC2. The CCA may be part of an extended LBT procedure which involves a backoff before starting to transmit. Further, the CCA may be part of a shortened LBT procedure which requires no backoff before starting to transmit.

In the following examples, the description of an UL grant to schedule UL resources may refer to a single UE-specific DCI, or to a two-stage process with PUSCH trigger A sent using UE-specific DCI and PUSCH trigger B sent using a common or UE-specific DCI. A scheduled UL radio transmission, i.e., an UL radio transmission performed on radio resources allocated by an UL grant, may for example include a PUSCH transmission and/or a transmission on short/long PUCCH. In each of the illustrated examples, the UE may compute its PHR (Power Headroom Report) assuming that all potentially available carriers are used for parallel UL radio transmissions, irrespective whether CCA is successful on the individual carriers.

In FIGS. 5, 6, 7, 8, 9A, 9B, 10A, and 10B, a sequence of boxes for each carrier illustrates subframes which are potentially usable for UL radio transmissions. Subframes used for an UL radio transmission are marked with "U". A subframe where the UE receives a UL grant allocating radio resources of the carrier to the UE is denoted by "G". The UL grant may be received on a DL control channel, e.g., a PDCCH or ePDCCH. In some scenarios, such DL control channel could be transmitted on the same carrier, e.g., when using a TDD transmission mode. A subframe where the UE defers its transmission is denoted by "D". The subframes which include radio resources allocated by the UL grant are indicated by arrows extending from the subframe in which the UL grant is received. A subframe where the UE cannot transmit due to unsuccessful LBT is denoted by "X". Successful CCA on the carrier is illustrated by a shaded box.

Figure 5:
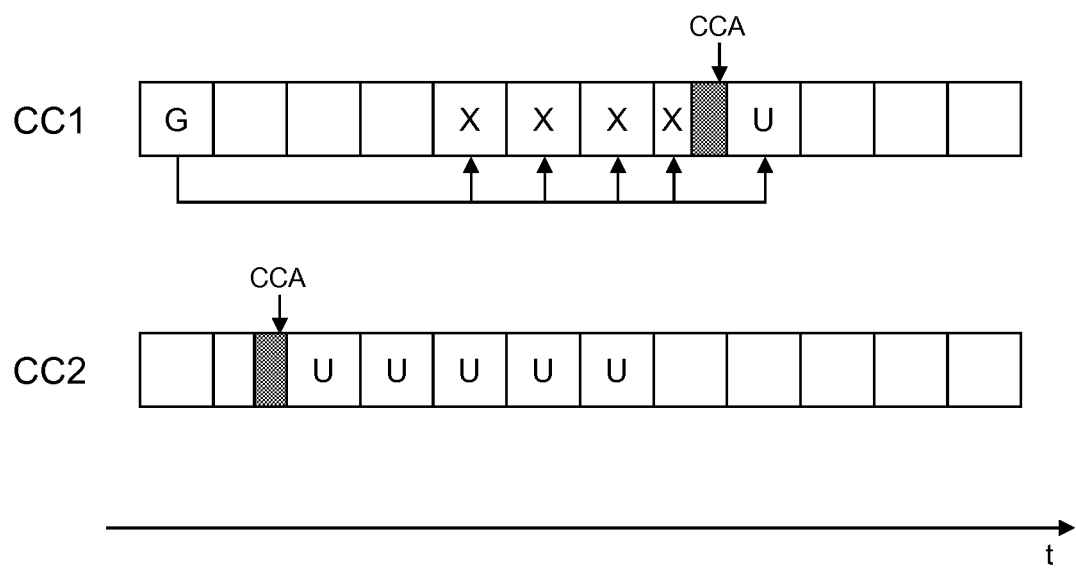
FIG. 5 illustrates an example of a scenario where a UE performs UL radio transmissions on two different unlicensed carriers which require utilization of different access schemes, without using coordination according to an embodiment of the invention.

In the example of FIG. 5, it is assumed that there is no coordination of UL radio transmissions on the carrier CC1 and UL radio transmissions on the carrier CC2. Accordingly, the UE can start an UL transmission on the carrier CC2, which allows grant-less transmission, during any subframe after successful CCA. As compared to that, an UL radio transmission on the carrier CC1, which requires dynamic scheduling, is possible only on those subframes which include radio resources which were allocated by an UL grant to the UE. In the scenario of FIG. 5, this has the effect that an ongoing UL radio transmission on the carrier CC2 partially overlaps with the subframes which include radio resources allocated by the UL grant on CC1. If the subframe where the UL grant is received is denoted by index n, the radio resources allocated by the UL grant are in the subframes with index n+4, n+5, n+6, n+7, and n+8. In the scenario of FIG. 5, the UE performs a successful CCA procedure on the carrier CC2 before the subframe with index n+2 and starts with the UL radio transmission on the carrier CC2. This UL radio transmission ends in the subframe with index n+6. Due to self-interference from the ongoing UL radio transmission on the carrier CC2, LBT on the carrier CC1 is unsuccessful in the subframes with index n+4, n+5, and n+6. Only in the subframe with index n+7, after the UL radio transmission on the carrier CC2 ended, the UE can successfully perform CCA and start the UL radio transmission on CC1 in the subframe with index n+8. As can be seen, the result is inefficient usage of the radio resources of the carrier CC1. In the examples as further detailed below, such problems can be avoided by coordination of the UL radio transmissions on the different unlicensed carriers.

Figure 6:
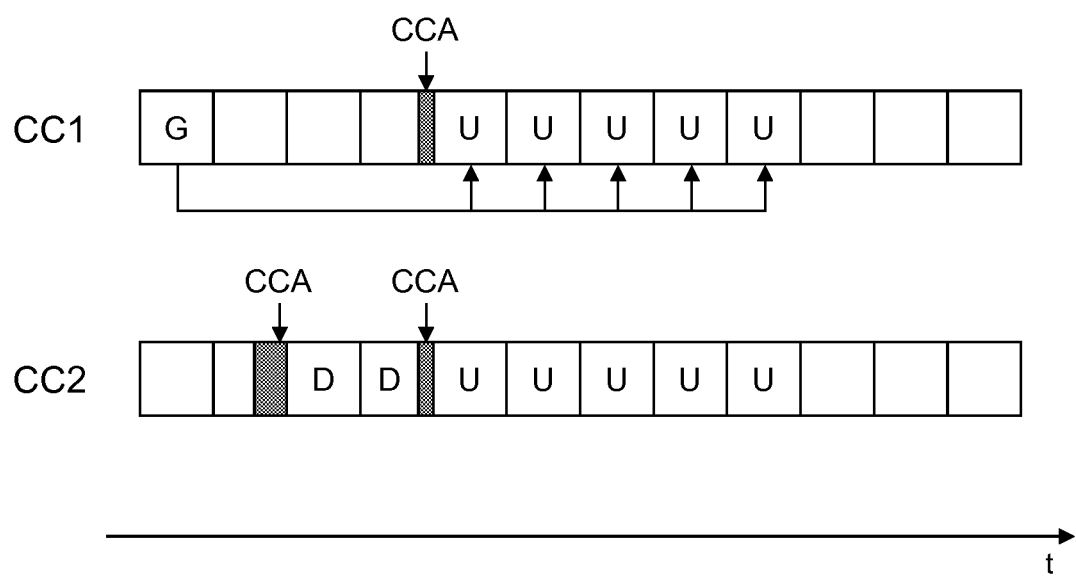
FIG. 6 illustrates an example of coordination of UL radio transmissions on two different unlicensed carriers according to an embodiment of the invention.

The scenario of FIG. 6 is similar to that of FIG. 5, but involves coordination of UL radio transmissions on the carrier CC1 and UL radio transmissions on the carrier CC2. In the scenario of FIG. 6, the UE performs successful CCA on the carrier CC2 before the subframe with index n+2. As illustrated, this CCA may be part of an extended LBT procedure, including a backoff after detecting that the carrier CC1 is unoccupied. However, after the successful CCA before the subframe with index n+2, the UE defers starting the UL radio transmission on the carrier CC2 until the first subframe including radio resources allocated by the UL grant on the carrier CC1, i.e., until the subframe with index n+4. After successful CCA on both carriers before the subframe with index n+4, the UE starts with the UL radio transmissions on both carriers CC1, CC2. The CCA performed on the carriers before the subframe with index n+4 may be part of a shortened LBT procedure which requires no backoff after detecting that the carrier CC1 is unoccupied. Here, using the shortened LBT procedure is acceptable because an extended LBT procedure with backoff was already performed before the subframe with index n+2. Because during the CCA on one of the carriers the UE is not transmitting on the other carrier, the outcome of the CCA is not affected. As compared to the scenario of FIG. 5, the UE can therefore also transmit during the subframes with index n+4, n+5, n+6, and n+7 on the carrier CC1. Accordingly, the radio resources are utilized in an efficient manner.

Figure 7:
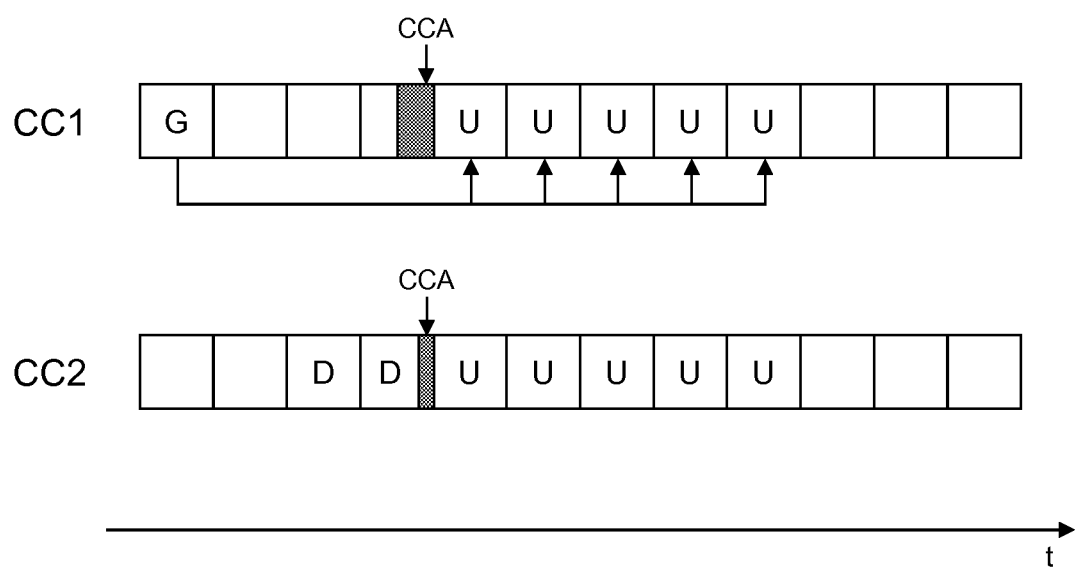
FIG. 7 illustrates a further example of coordination of UL radio transmissions on two different unlicensed carriers according to an embodiment of the invention.

FIG. 7 illustrates a further example of a scenario which is similar to that of FIG. 5 and involves coordination of UL radio transmissions on the carrier CC1 and UL radio transmissions on the carrier CC2. In the scenario of FIG. 7, the UE has data to transmit already in the subframe with index n+2. However, rather than immediately initiating an LBT procedure on the carrier CC2, the UE defers its transmission until the first subframe including radio resources allocated by the UL grant on the carrier CC1, i.e., until the subframe with index n+4. After successful CCA on both carriers before the subframe with index n+4, the UE starts with the UL radio transmissions on both carriers CC1, CC2. As illustrated, the CCA performed on the carrier CC1 before the subframe with index n+4 part of an extended LBT procedure which includes a backoff after detecting that the carrier CC1 is unoccupied, while the CCA performed on the carrier CC2 before the subframe with index n+4 may be part of a shortened LBT procedure which requires no backoff after detecting that the carrier CC1 is unoccupied. Here, using the shortened LBT procedure on the carrier CC2 is acceptable because an extended LBT procedure with backoff is performed on the carrier CC1. Because during the CCA on one of the carriers the UE is not transmitting on the other carrier, the outcome of the CCA is not affected. As compared to the scenario of FIG. 5, the UE can therefore also transmit during the subframes with index n+4, n+5, n+6, and n+7 on the carrier CC1. Accordingly, the radio resources are utilized in an efficient manner.

Figure 8:
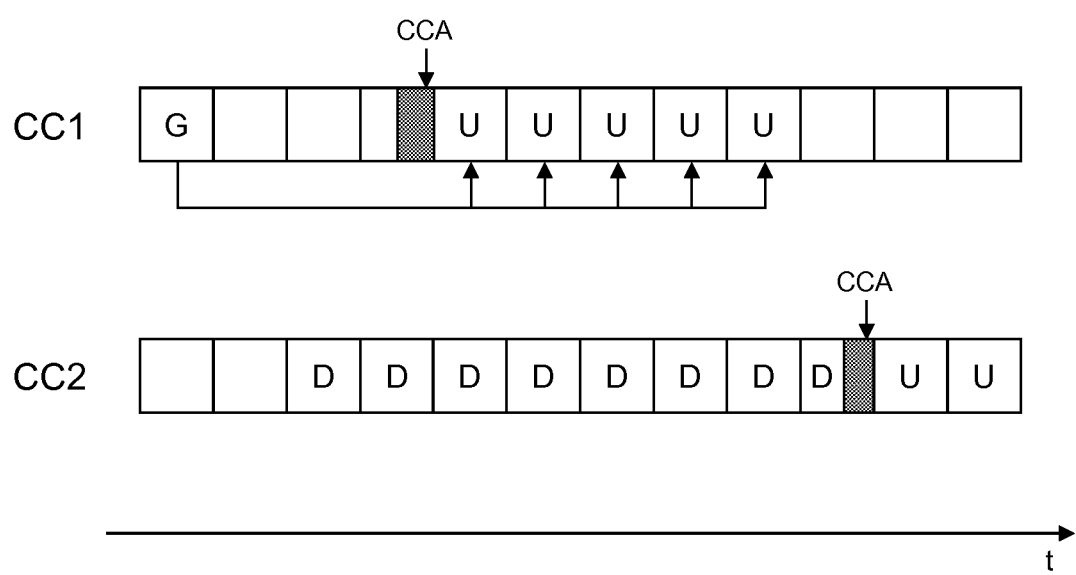
FIG. 8 illustrates a further example of coordination of UL radio transmissions on two different unlicensed carriers according to an embodiment of the invention.

FIG. 8 illustrates a further example of a scenario which is similar to that of FIG. 5 and involves coordination of UL radio transmissions on the carrier CC1 and UL radio transmissions on the carrier CC2. In the scenario of FIG. 8, the UE has data to transmit already in the subframe with index n+2. However, rather than immediately initiating an LBT procedure on the carrier CC2, the UE defers its transmission until after the last subframe including radio resources allocated by the UL grant on the carrier CC1. After successful CCA on the carrier CC1 before the subframe with index n+4, the UE starts with the UL radio transmissions on the carrier CC1. After successful CCA on the carrier CC2 before the subframe with index n+10, the UE starts with the UL radio transmissions on the carrier CC2. As illustrated, the CCA performed on both carriers CC1, CC2 may be part of an extended LBT procedure which includes a backoff after detecting that the carrier is unoccupied. However, the CCA performed on the carrier CC2 before the subframe with index n+10 could also be part of a shortened LBT procedure which requires no backoff after detecting that the carrier CC1 is unoccupied. Because during the CCA on one of the carriers the UE is not transmitting on the other carrier, the outcome of the CCA is not affected. As compared to the scenario of FIG. 5, the UE can therefore also transmit during the subframes with index n+4, n+5, n+6, and n+7 on the carrier CC1. Accordingly, the radio resources are utilized in an efficient manner.

Figure 9A:
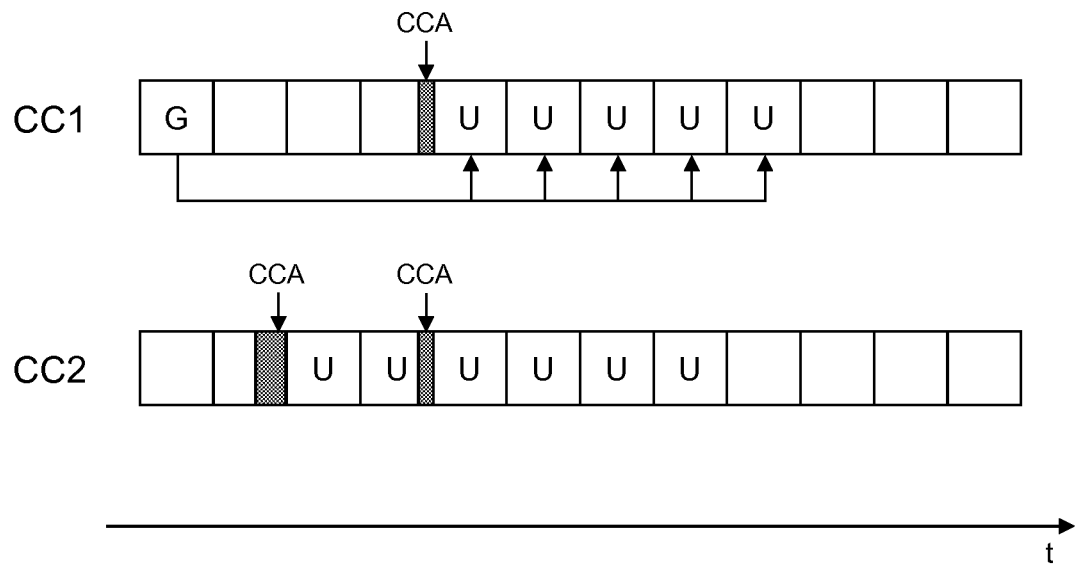
FIG. 9 illustrates a further example of coordination of UL radio transmissions on two different unlicensed carriers according to an embodiment of the invention.
Figure 9B:
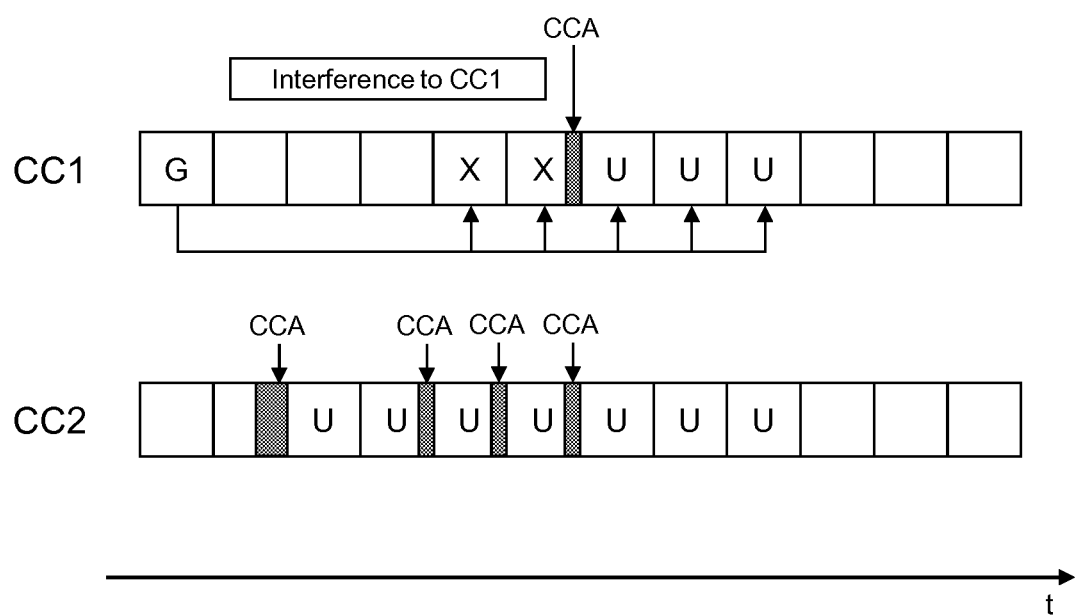

FIGS. 9A and 9B illustrate a further example of a scenario which is similar to that of FIG. 5 and involves coordination of UL radio transmissions on the carrier CC1 and UL radio transmissions on the carrier CC2. In the scenario of FIG. 9A, the UE performs a successful CCA procedure on the carrier CC2 before the subframe with index n+2 and starts with the UL radio transmission on the carrier CC2. As illustrated, the CCA performed on the carrier CC1 before the subframe with index n+2 may be part of an extended LBT procedure which includes a backoff after detecting that the carrier is unoccupied. Before the first subframe including radio resources allocated by the UL grant received on the carrier CC1, in the illustrated example the subframe with index n+4, the UE interrupts the ongoing UL radio transmission on the carrier CC2. Accordingly, a gap for CCA on the carrier CC1 is introduced into the UL radio transmission on the carrier CC2. As illustrated, in this gap the UE may also perform CCA on the carrier CC2, thereby ensuring that both carriers are unoccupied. The detailed timing of the gap, i.e., start time, end time, and duration may depend on the type of LBT procedure used on the carriers CC1 and CC2. Further, the end time of the gap may depend on a start position of a data channel, e.g., PUSCH, within the next subframe. For example, if the data channel starts already with the first modulation symbol of the subframe, the gap may be configured to end at or before the start of the subframe. If the data channel starts with a later modulation symbol of the subframe, the gap may be configured to end within the next subframe, before the start of the data channel within the subframe. After successful CCA on the carriers CC1, CC2 before the subframe with index n+4, the UE starts with the UL radio transmission on the carrier CC1 and continues with the UL radio transmission on the carrier CC2. As illustrated, the CCA performed on both carriers CC1, CC2 before the subframe with index n+4 may be part of a shortened LBT procedure which requires no backoff after detecting that the carrier CC1, CC2 is unoccupied. Here, using the shortened LBT procedure is acceptable because an extended LBT procedure with backoff was already performed before the subframe with index n+2.

Because during the CCA on one of the carriers the UE is not transmitting on the other carrier, the outcome of the CCA is not affected. As compared to the scenario of FIG. 5, the UE can therefore also transmit during the subframes with index n+4, n+5, n+6, and n+7 on the carrier CC1. Further, also utilization of the subframes with index n+2 and n+3 is possible on the carrier CC2. The latter further enhances efficiency of radio resource utilization. In addition, it can be avoided that some other radio device occupies the carrier CC1 and/or CC2 while the UE is deferring its transmission.

In some scenarios, multiple gaps may be introduced in the ongoing UL radio transmission on the carrier CC2. An example of a corresponding scenario is illustrated in FIG. 9B. In the scenario of FIG. 9A, the UE performs a successful CCA procedure on the carrier CC2 before the subframe with index n+2 and starts with the UL radio transmission on the carrier CC2. As illustrated, the CCA performed on the carrier CC1 before the subframe with index n+2 may be part of an extended LBT procedure which includes a backoff after detecting that the carrier is unoccupied. Before the first subframe including radio resources allocated by the UL grant received on the carrier CC1, in the illustrated example the subframe with index n+4, the UE interrupts the ongoing UL radio transmission on the carrier CC2. Accordingly, a gap for CCA on the carrier CC1 is introduced into the UL radio transmission on the carrier CC2. As illustrated, in this gap the UE may also perform CCA on the carrier CC2, to ensure that both carriers are unoccupied. As mentioned above, the detailed timing of the gap, i.e., start time, end time, and duration may depend on the type of LBT procedure used on the carriers CC1 and CC2 and/or on a start position of a data channel, e.g., PUSCH, within the next subframe.

As compared to the scenario of FIG. 9A, the scenario of FIG. 9B assumes that during the subframes with index n+1 to n+5 there is interference to the carrier CC1, e.g., from some other radio device transmitting on the carrier CC1 or on a frequency which is close to the carrier CC1. This interference however does not affect the carrier CC2. Accordingly, before the subframe with index n+4 CCA on the carrier CC1 is unsuccessful, and in the subframe with index n+4 the UE cannot start transmitting on the carrier CC1. On the carrier CC2 CCA is successful before the subframe with index n+4, and the UE thus continues with the UL radio transmission on the carrier CC2. Since the UE could not start its transmission on the carrier CC1, it again interrupts the ongoing UL radio transmission on the carrier CC2 before the next subframe including radio resources allocated by the UL grant received on the carrier CC1, in the illustrated example the subframe with index n+5. Accordingly, a further gap for CCA on the carrier CC1 is introduced into the UL radio transmission on the carrier CC2. Again, this gap may also be used by the UE to perform CCA on the carrier CC2. The detailed timing of the gap, i.e., start time, end time, and duration may depend on the type of LBT procedure used on the carriers CC1 and CC2 and/or on a start position of a data channel, e.g., PUSCH, within the next subframe. If the start position of the data channel varies from one subframe to the other, also the position or duration of the gap could vary as compared to the gap introduced before the subframe with index n+4. Since in the illustrated example the interference to the carrier CC1 still exists at the beginning of the subframe with index n+4, the CCA on the carrier CC1 is unsuccessful also before the subframe with index n+5, and also in the subframe with index n+5 the UE cannot start transmitting on the carrier CC1. On the carrier CC2 CCA is successful also before the subframe with index n+5, and the UE thus continues with the UL radio transmission on the carrier CC2. Since the UE still could not start its transmission on the carrier CC1, it again interrupts the ongoing UL radio transmission on the carrier CC2 before the next subframe including radio resources allocated by the UL grant received on the carrier CC1, in the illustrated example the subframe with index n+6, and a still further gap for CCA on the carrier CC1 is introduced into the UL radio transmission on the carrier CC2. Again, this gap may also be used by the UE to perform CCA on the carrier CC2. Again, the detailed timing of the gap, i.e., start time, end time, and duration may depend on the type of LBT procedure used on the carriers CC1 and CC2 and/or on a start position of a data channel, e.g., PUSCH, within the next subframe. If the start position of the data channel varies from one subframe to the other, also the position or duration of the gap could vary as compared to the gap introduced before the subframe with index n+4 or the gap introduced before the subframe with index n=5. Since in the illustrated example the interference to the carrier CC1 has ceased before the beginning of the subframe with index n=6, the CCA performed during the gap before the beginning of the subframe with index n=6, CCA is now successful on both carriers CC1, CC2, and the UE starts with the UL radio transmission on the carrier CC1 and continues with the UL radio transmission on the carrier CC2.

In the example of FIG. 9B, the CCA performed during the gaps in the UL radio transmission on CC2 may be part of a shortened LBT procedure which requires no backoff after detecting that the carrier CC1, CC2 is unoccupied. Here, using the shortened LBT procedure is acceptable because an extended LBT procedure with backoff was already performed before the subframe with index n+2. It is noted that in some scenarios it could also happen that interference arises on the carrier CC2, resulting in an unsuccessful CCA on the carrier CC2. In such case, the UE would not continue with its UL radio transmission on the carrier CC2.

As can be seen from the examples of FIGS. 9A and 9B, interference may be taken into account in an efficient manner by ending or interrupting an ongoing UL radio transmission on one of the carriers CC1, CC2, so that CCA on the other carrier is not affected.

Figure 10A:
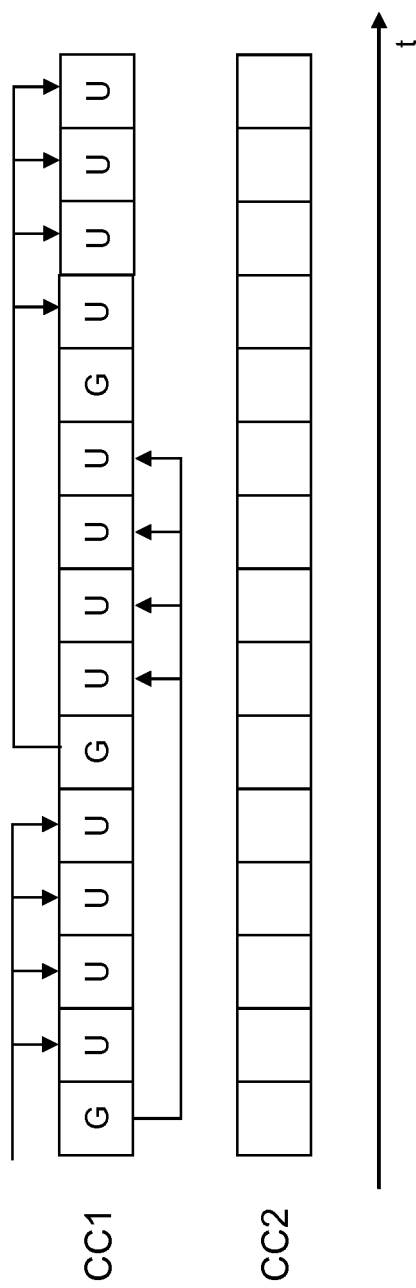
FIGS. 10A and 10B illustrates a further example of coordination of UL radio transmissions on two different unlicensed carriers according to an embodiment of the invention.
Figure 10B:
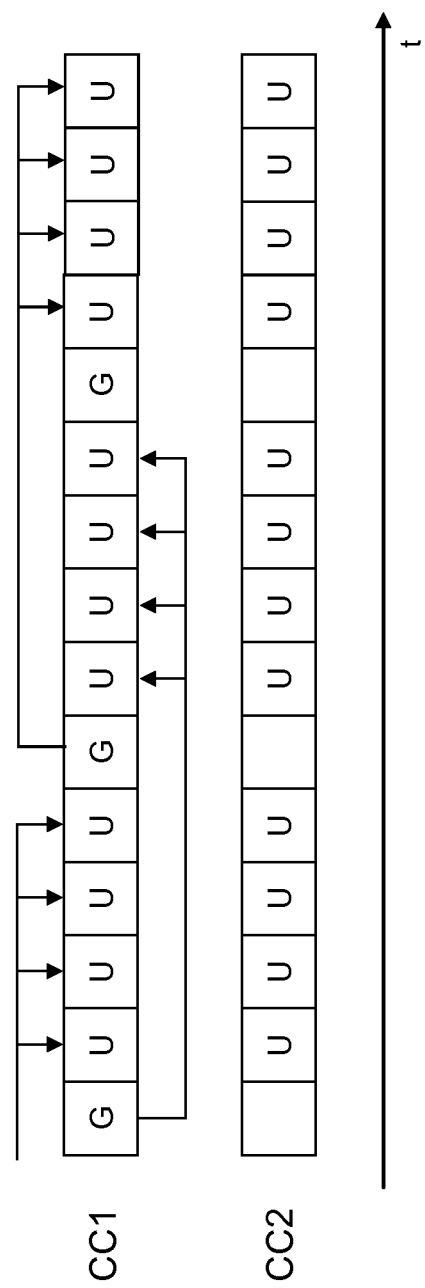

FIGS. 10A and 10B illustrate a further example of a scenario which is similar to that of FIG. 5 and involves coordination of UL radio transmissions on the carrier CC1 and UL radio transmissions on the carrier CC2. FIG. 10A, illustrates that subframes in which the UE receives UL grants may be interweaved with the subframes used for UL radio transmissions, with the aim of leaving as few as possible subframes unused. This may be achieved by a variable time offset between transmission of the UL grant and the first subframe including radio resources allocated by the UL grant. In the example of FIG. 10A no subframes are left unused on the carrier CC1. However, in the example of FIG. 10A the UE does not transmit on the carrier CC2. If the UE would transmit on the carrier CC2, this might affect the UE's transmissions on the carrier CC1. For example, if the UE does not support simultaneous transmission on one carrier and reception on another carrier, an UL radio transmission on the carrier CC2 could block the reception of one or more of the UL grants for the carrier CC1. Further, an UL radio transmission on the carrier CC2 could block reception of DMRS on the carrier CC1. As a result, the illustrated interweaving might no longer be possible and/or UL transmission performance degraded. FIG. 10B illustrates an example of a scenario in which such problems are addressed by coordination of the UL radio transmissions on the carrier CC1 and the UL radio transmissions on the carrier CC2. In the scenario of FIG. 10B, the UE aligns the UL radio transmissions on the carrier CC2 with the subframes including radio resources allocated by the UL grants received on the carrier CC1. The result is that, when an UL radio transmission on the carrier CC1 ends, an UL radio transmission on the carrier CC2 would end as well, so that the UE can then receive the next UL grant on the carrier CC1. This may for example be achieved by configuring the UE to check whether the next subframe on the carrier CC1 includes radio resources allocated by an UL grant and, if this is not the case, terminating an ongoing UL radio transmission on the carrier CC2 before the next subframe even though the UE might still have data to transmit on the carrier CC2. In the next subframe, the UE may then receive an UL grant, as illustrated in FIG. 10B. In addition or as an alternative the next subframe could also be used by the UE to receive other control information and/or DMRS on the carrier CC1.

It is noted that FIGS. 10A and 10B do not illustrate LBT procedures or CCA required to perform the illustrated UL radio transmissions. However, it is to be understood that LBT and CCA on the different carriers may be coordinated as explained in connection with FIGS. 6, 7, 8, 9A, and 9B.

Figure 11:
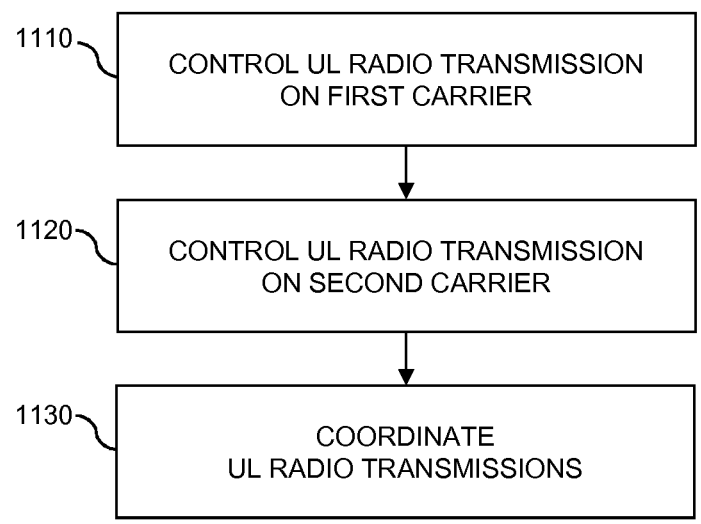
FIG. 11 shows a flowchart for schematically illustrating a method according to an embodiment of the invention.

FIG. 11 shows a flowchart for illustrating a method of controlling radio transmissions. The method of FIG. 11 may be utilized for implementing the illustrated concepts in a radio device, such as the above-mentioned UE 10. If a processor-based implementation of the radio device is used, the steps of the method may be performed by one or more processors of the radio device. In such a case the radio device may further comprise a memory in which program code for implementing the below described functionalities is stored.

At step 1110, the radio device controlling a first UL radio transmission on a first carrier from an unlicensed frequency spectrum. The first UL radio transmission is controlled on the basis of a first access scheme.

At step 1120, the radio device controls a second UL radio transmission on a second second carrier from the unlicensed frequency spectrum. The first UL radio transmission is controlled on the basis of a second access scheme which is different from the first access scheme.

In some scenarios, the first access scheme may involve that radio resources of the first carrier are allocated to the radio device by a first type of grant received from the wireless communication network, while the second access scheme involves that radio resources of the second carrier are allocated to the radio device by a second type of grant which has a longer validity than the first type of grant. For example, the first type of grant could be a dynamic scheduling grant sent in response to a scheduling request from the radio device, and the second type of grant could be an SPS grant or an IUA grant, which is sent without scheduling request from the radio device. The first type for grant may be valid for a limited number of subframes, while the second type of grant is valid in a reoccurring manner in a sequence of subframes, until the grant is released.

In some scenarios, the first access scheme may involve that radio resources of the first carrier are allocated to the radio device in response to a request from the radio device, while the second access scheme involves that radio resources of the second carrier are allocated to the radio device without request from the radio device. For example, the radio resources of the first carrier could be allocated by a dynamic scheduling grant, which is sent in response to a scheduling request from the radio device, and the radio resources of the second carrier are allocated by an SPS grant or an IUA grant, which is sent without scheduling request from the radio device.

In some scenarios, the first access scheme may involve that radio resources radio resources of the first carrier are allocated to the radio device by a grant from the wireless communication network, while the second access scheme does not require allocation of radio resources to the radio device by a grant from the wireless communication network. For example, the radio resources of the first carrier could be allocated by a dynamic scheduling grant, which is sent in response to a scheduling request from the radio device or by an IUA grant or SPS grant, and the radio resources of the second carrier could be accessible without requiring resource allocation by the wireless communication network, e.g., through grant-less access.

At step 1130, the radio device coordinates the first UL radio transmission and the second UL radio transmission. In some scenarios, the radio device may receive a grant allocating radio resources of the first carrier to the radio device and, before starting to perform the first UL radio transmission on the allocated radio resources, performing channel sensing on the first carrier. Examples of such channel sensing are the CCA operations performed in the examples of FIGS. 6, 7, 8, 9A, and 9B before the UE start with the UL transmission on the carrier CC1. The channel sensing may be part of an LBT procedure. The LBT procedure may correspond to an extended LBT procedure which requires initiating a backoff period when detecting that the carrier is unoccupied, and starting to transmit only after expiry of the backoff period, e.g., as explained in connection with FIGS. 4A and 4B. The LBT procedure may also correspond to a shortened LBT procedure which does not require initiating a backoff period when detecting that the carrier is unoccupied, and allows starting to transmit immediately after detecting that the carrier is unoccupied. The coordination of step 1130 may then involve that the radio device may then perform the second UL radio transmission in at least one time window which is non-overlapping with the channel sensing on the first carrier. The examples of FIGS. 6, 7, 8, 9A, and 9B show a corresponding coordinated timing of the UL radio transmission on the carrier CC2.

In some scenarios, the at least one time window may include a time window starting after the channel sensing on the first carrier. The examples of FIGS. 6, 7, 8, 9A, and 9B show a corresponding coordinated timing of the UL radio transmission on the carrier CC2. In the examples of FIGS. 6, 7, and 9A such time window starts after the CCA before the subframe with index n+4. In the example of FIG. 8 such time window starts in the subframe with index n+10. In the example of FIG. 9B, the UL radio transmission includes a time window starting after the CCA before the subframe with index n+4, a time window starting after the CCA before the subframe with index n+5, and a time window starting after the CCA before the subframe with index n+6.

In some scenarios, the at least one time window may include a time window starting after the first radio transmission. The example of FIG. 8 shows a corresponding coordinated timing of the UL radio transmission on the carrier CC2. In this example, the time window starts in the subframe with index n+10, after the UE finished the UL radio transmission on the carrier CC1.

In some scenarios, the at least one time window may include a time window ending before the channel sensing on the first carrier. The examples of FIGS. 9A and 9B show a corresponding coordinated timing of the UL radio transmission on the carrier CC2. In these examples, the UL radio transmission on the carrier CC2 includes a time window ending before the CCA before the subframe with index n+4. In the example of FIG. 9B, the UL radio transmission on the carrier CC2 includes a time window ending before the CCA before the subframe with index n+4, two time windows ending before the CCA before the subframe with index n+5, and three time windows ending before the CCA before the subframe with index n+5.

It is also possible that the at least one time window includes a first time window ending before the channel sensing on the first carrier and a second time window starting after the channel sensing on the first carrier. The examples of FIGS. 9A and 9B show a corresponding coordinated timing of the UL radio transmission on the carrier CC2. In this case, a gap is included between the first time window and the second time window, and this gap may be used for the channel sensing on the first carrier.

In some scenarios, the radio device may perform channel sensing on the second carrier before starting to perform the second uplink radio transmission. Examples of such channel sensing are the CCA operations performed in the examples of FIGS. 6, 7, 8, 9A, and 9B before the UE start with the UL transmission on the carrier CC1. The channel sensing may be part of an LBT procedure. The LBT procedure may correspond to an extended LBT procedure which requires initiating a backoff period when detecting that the carrier is unoccupied, and starting to transmit only after expiry of the backoff period, e.g., as explained in connection with FIGS. 4A and 4B. The LBT procedure may also correspond to a shortened LBT procedure which does not require initiating a backoff period when detecting that the carrier is unoccupied, and allows starting to transmit immediately after detecting that the carrier is unoccupied. In such scenarios, the at least one time window may include a time window between the channel sensing on the second carrier and the channel sensing on the first carrier. The examples of FIGS. 9A and 9B show a corresponding coordinated timing of the UL radio transmission on the carrier CC2. In the example of FIG. 9A, the UL radio transmission on the carrier CC2 includes a time window between the CCA on the carrier CC2 before the subframe with index n+2 and the CCA on the carrier CC1 before the subframe with index n+4. In the example of FIG. 9B, the UL radio transmission on the carrier CC2 includes a time window between the CCA on the carrier CC2 before the subframe with index n+2 and the unsuccessful CCA on the carrier CC1 before the subframe with index n+4, a time window between the CCA on the carrier CC2 before the subframe with index n+2 and the unsuccessful CCA on the carrier CC1 before the subframe with index n+5, and a time window between the CCA on the carrier CC2 before the subframe with index n+2 and the successful CCA on the carrier CC1 before the subframe with index n+6.

In some scenarios, the coordination may involve that during the channel sensing on the first carrier, the radio device also performs channel sensing on the second carrier. The examples of FIGS. 6, 7, 9A, and 9B show a corresponding coordination of channel sensing.

In some scenarios, the radio resources allocated by the received grant define an end time of the first UL radio transmission. The coordination may then involve that the radio device ends the second UL radio transmission at the end time of the first uplink radio transmission. A corresponding example is shown in FIG. 10B. After ending the first UL radio transmission and the second UL radio transmission, the radio device may then receive a further grant allocating radio resources of the first carrier to the radio device. In addition or as an alternative to receiving a further grant, the radio device could also receive other control information or reference signals.

In some scenarios, the coordination may also involve controlling the usage of a backoff during LBT on the first carrier or second carrier. For example, the radio device may perform channel sensing on the first carrier and, in response to detecting that the first carrier is unoccupied, initiate a backoff period. Accordingly, the radio device may perform an extended LBT procedure on the first carrier. Upon expiry of the backoff period, the radio device may then performing further channel sensing on the first carrier and start the first UL radio transmission in response to the further channel sensing on the first carrier indicating that the first carrier is unoccupied. Further, upon expiry of the backoff period, the radio device may also performing channel sensing on the second carrier and start the second UL radio transmission in response to the channel sensing on the second carrier indicating that the second carrier is unoccupied. In this case, the second UL radio transmission may be started immediately after detecting that the second carrier is unoccupied, without initiating a backoff period. That is to say, a shortened LBT procedure on one of the first and second carriers may be coordinated with an extended LBT procedure on the other of the first and second carriers. The examples of FIGS. 6, 7, 9A, and 9B show a corresponding coordination of channel sensing.

Figure 12:
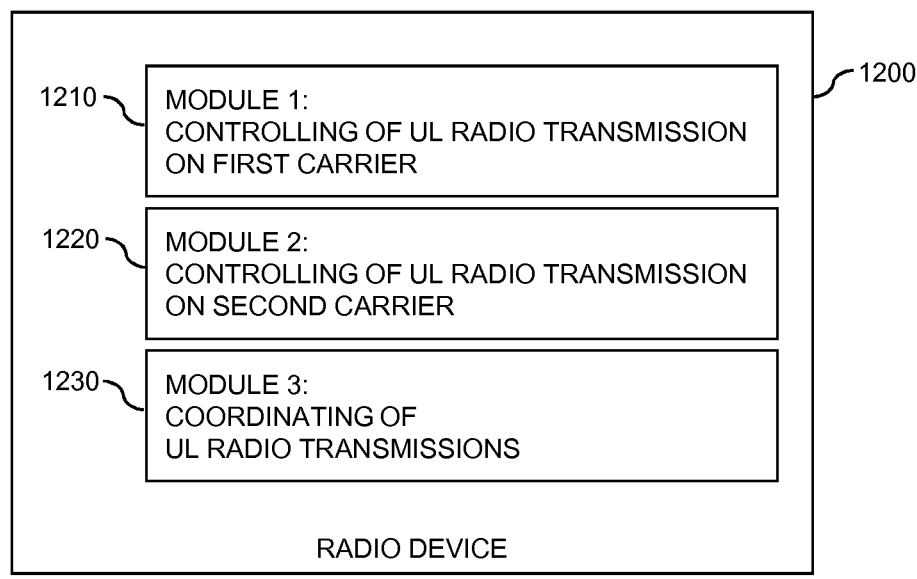
FIG. 12 shows a block diagram for illustrating functionalities of a radio device according to an embodiment of the invention.

FIG. 12 shows a block diagram for illustrating functionalities of a radio device 1200 which operates according to the method of FIG. 11. As illustrated, the radio device 1200 may be provided with a module 1210 configured to control a first UL radio transmission on a first carrier from an unlicensed frequency spectrum on the basis of a first access scheme, such as explained in connection with step 1110. Further, the radio device 1200 may be provided with a module 1220 configured to control a second UL radio transmission on a second carrier from the unlicensed frequency spectrum on the basis of a second access scheme which is different from the first access scheme, such as explained in connection with step 1120. Further, radio device 1200 may be provided with a module 1230 configured to coordinate the first UL radio transmission and the second radio transmission, such as explained in connection with step 1130.

It is noted that the radio device 1200 may include further modules for implementing other functionalities, such as known functionalities of a UE supporting the LTE radio technology. Further, it is noted that the modules of the radio device 1200 do not necessarily represent a hardware structure of the radio device 1200, but may also correspond to functional elements, e.g., implemented by hardware, software, or a combination thereof.

It is noted that the illustrated concepts could also be implemented in a system which includes a radio device configured to operate according to the method of FIG. 11 and an access node which is configured to receive the first UL radio transmission and the second UL radio transmission, such as the above-mentioned access node 100.

Figure 13:
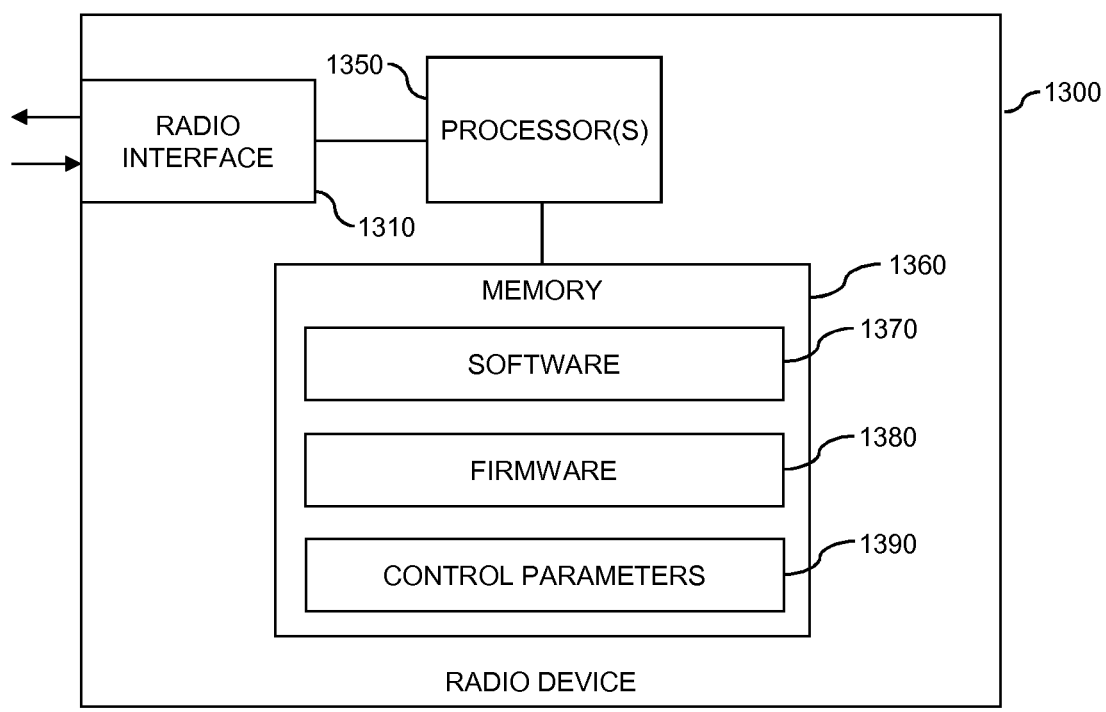
FIG. 13 schematically illustrates structures of a radio device according to an embodiment of the invention.

FIG. 13 illustrates a processor-based implementation of a radio device 1300 which may be used for implementing the above described concepts. For example, the structures as illustrated in FIG. 13 may be used for implementing the above-mentioned UE 10.

As illustrated, the radio device 1300 may include a radio interface 1310 for communicating with a wireless communication network, e.g., with an access node of the wireless communication network, such as the above-mentioned access node 100. The radio interface 1310 may be used for sending the above-mentioned UL radio transmissions. Further, the radio interface 1310 may be used for receiving control information, such as the above-mentioned grants or similar resource allocation information. The radio interface 1310 may for example be based on the LTE radio technology.

Further, the radio device 1300 may include one or more processors 1350 coupled to the radio interface 1310 and a memory 1360 coupled to the processor(s) 1350. By way of example, the radio interface 1310, the processor(s) 1350, and the memory 1360 could be coupled by one or more internal bus systems of the radio device 1300. The memory 1360 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1360 may include software 1370, firmware 1380, and/or control parameters 1390. The memory 1360 may include suitably configured program code to be executed by the processor(s) 1350 so as to implement the above-described functionalities of a radio device, such as explained in connection with FIG. 11.

It is to be understood that the structures as illustrated in FIG. 13 are merely schematic and that the radio device 1300 may actually include further components which, for the sake of clarity, have not been illustrated, e.g., further interfaces or processors. Also, it is to be understood that the memory 1360 may include further program code for implementing known functionalities of a radio device, e.g., known functionalities of a UE. According to some embodiments, also a computer program may be provided for implementing functionalities of the radio device 1300, e.g., in the form of a physical medium storing the program code and/or other data to be stored in the memory 1360 or by making the program code available for download or by streaming.

As can be seen, the concepts as described above may be used for efficiently controlling UL radio transmissions in an unlicensed frequency spectrum. Specifically, the concepts may be used to avoid that dynamically scheduled UL radio transmissions on an unlicensed carrier are affected by UL radio transmissions on other carriers which utilize a different access scheme, e.g., based on semi-persistent grants, based on IUA allocation, or based on grant-less access. Using the concepts, one or more carriers which were found to be occupied when starting a transmission on one of the carriers, may be later joined into the transmission, e.g., by using carrier aggregation. In this way UL performance can be enhanced. Further, the concepts can be implemented without requiring excessive changes in existing hardware or software of radio devices or network nodes.

It is to be understood that the examples and embodiments as explained above are merely illustrative and susceptible to various modifications. For example, the illustrated concepts may be applied in connection with various kinds of wireless communication technologies, without limitation to the above-mentioned examples of LTE, LTE LAA, or MuLTEfire. For example, the concepts could also be applied to a 5G (5th Generation) radio technology, such as the NR (new Radio) technology developed by 3GPP. Further, the illustrated concepts may be applied with respect to various numbers carriers from the unlicensed frequency spectrum, e.g., three or more carriers, and/or with respect to various numbers of different access schemes, e.g., three or more different access schemes. Further, the illustrated concepts may be applied in various kinds of radio devices, including mobile phones, portable computing devices, machine type communication devices, base stations, and relay stations. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices.

The invention claimed is:

1. A method of controlling radio transmission in a wireless communication network, the method comprising a radio device:
   controlling a first uplink radio transmission on a first carrier from an unlicensed frequency spectrum based on a first access scheme, wherein the first access scheme is associated with radio resources allocated to the radio device by a first type of grant, and wherein the first type of grant is a first grant that is valid for a limited number of subframes;
   controlling a second uplink radio transmission on a second carrier from the unlicensed frequency spectrum based on a second access scheme, wherein the second access scheme is associated with radio resources allocated to the radio device by a second type of grant, and wherein the second type of grant is a second grant that is valid in a recurring manner in a sequence of subframes until the second grant is released; and
   coordinating a timing of the second uplink radio transmission relative to the first uplink radio transmission.

2. The method of claim 1, further comprising the radio device:
   receiving a grant allocating radio resources of the first carrier to the radio device;
   performing channel sensing on the first carrier before starting to perform the first uplink radio transmission on the allocated radio resources; and
   performing the second uplink radio transmission in at least one time window which is non-overlapping with the channel sensing on the first carrier.

3. The method of claim 2, wherein the at least one time window comprises a time window starting after the channel sensing on the first carrier.

4. The method of claim 2, wherein the at least one time window comprises a time window starting after the first radio transmission.

5. The method of claim 2, wherein the at least one time window comprises a time window ending before the channel sensing on the first carrier.

6. The method of claim 2, further comprising:
   the radio device performing channel sensing on the second carrier before starting to perform the second uplink radio transmission;
   wherein the at least one time window comprises a time window between the channel sensing on the second carrier and the channel sensing on the first carrier.

7. The method of claim 2, further comprising the radio device performing channel sensing on the second carrier during the channel sensing on the first carrier.

8. The method of claim 2:
   wherein the radio resources allocated by the received grant define an end time of the first uplink radio transmission; and
   further comprising the radio device ending the second uplink radio transmission at the end time of the first uplink radio transmission.

9. The method of claim 8, further comprising, after ending the first uplink radio transmission and the second uplink radio transmission, the radio device receiving a further grant allocating radio resources of the first carrier to the radio device.

10. The method of claim 1, further comprising the radio device:
    performing channel sensing on the first carrier and, in response to detecting that the first carrier is unoccupied, initiating a backoff period;
    upon expiry of the backoff period, performing further channel sensing on the first carrier and starting the first uplink radio transmission in response to the further channel sensing on the first carrier indicating that the first carrier is unoccupied; and
    upon expiry of the backoff period, performing channel sensing on the second carrier and starting the second uplink radio transmission in response to the channel sensing on the second carrier indicating that the second carrier is unoccupied.

11. The method of claim 1 wherein the second type of grant has a longer validity than the first type of grant.

12. The method of claim 1:
    wherein the first access scheme involves that radio resources of the first carrier are allocated to the radio device in response to a request from the radio device; and
    wherein the second access scheme involves that radio resources of the second carrier are allocated to the radio device without request from the radio device.

13. The method of claim 1:
    wherein the first access scheme involves that radio resources radio resources of the first carrier are allocated to the radio device by a grant from the wireless communication network; and
    wherein the second access scheme does not require allocation of radio resources to the radio device by a grant from the wireless communication network.

14. A radio device for a wireless communication network, the radio device comprising:
    processing circuitry;
    memory containing instructions executable by the processing circuitry whereby the radio device is operative to:
      control a first uplink radio transmission on a first carrier from an unlicensed frequency spectrum based on a first access scheme, wherein the first access scheme is associated with radio resources allocated to the radio device by a first type of grant, and wherein the first type of grant is a first grant that is valid for a limited number of subframes;
      control a second uplink radio transmission on a second carrier from the unlicensed frequency spectrum based on a second access scheme, wherein the second access scheme is associated with radio resources allocated to the radio device by a second type of want, and wherein the second type of grant is a second grant that is valid in a recurring manner in a sequence of subframes until the second grant is released; and coordinate a timing of the second uplink radio transmission relative to the first uplink radio transmission.

15. The radio device of claim 14, wherein the instructions are such that the radio device is operative to:

receive a grant allocating radio resources of the first carrier to the radio device;

perform channel sensing on the first carrier before starting to perform the first uplink radio transmission on the allocated radio resources; and perform the second uplink radio transmission in at least one time window which is non-overlapping with the channel sensing on the first carrier.

16. A system, comprising:

an access node of a wireless communication network;

a radio device comprising:

processing circuitry; and memory containing instructions executable by the processing circuitry whereby the radio device is operative to:

control a first uplink radio transmission on a first carrier from an unlicensed frequency spectrum based on a first access scheme, wherein the first access scheme is associated with radio resources allocated to the radio device by a first type of grant, and wherein the first type of grant is a first grant that is valid for a limited number of subframes;

control a second uplink radio transmission on a second carrier from the unlicensed frequency spectrum based on a second access scheme, scheme wherein the second access scheme is associated with radio resources allocated to the radio device by a second type of grant, and wherein the second type of grant is a second grant that is valid in a recurring manner in a sequence of subframes until the second grant is released; and coordinate a timing of the second uplink radio transmission relative to the first uplink radio transmission; and wherein the access node is configured to receive the first uplink radio transmission and the second uplink radio transmission.

17. A non-transitory computer readable recording medium storing a computer program product for of controlling radio transmission in a wireless communication network, the computer program product comprising software instructions which, when run on processing circuitry of a radio device, causes the radio device to:

control a first uplink radio transmission on a first carrier from an unlicensed frequency spectrum based on a first access scheme, wherein the first access scheme is associated with radio resources allocated to the radio device by a first type of grant, and wherein the first type of grant is a first grant that is valid for a limited number of subframes;

control a second uplink radio transmission on a second carrier from the unlicensed frequency spectrum based on a second access scheme, wherein the second access scheme is associated with radio resources allocated to the radio device by a second type of grant, and wherein the second type of grant is a second grant that is valid in a recurring manner in a sequence of subframes until the second grant is released; and coordinate a timing of the second uplink radio transmission relative to the first uplink radio transmission.

\* \* \* \* \*